United States Patent Office 3,115,392
Patented Dec. 24, 1963

3,115,392
PRODUCTION OF OZONIDES
Joseph S. Hashman, Evans City, Pa., assignor to Callery Chemical Company, Pittsburgh, Pa., a corporation of Pennsylvania
No Drawing. Filed Dec. 5, 1960, Ser. No. 73,928
5 Claims. (Cl. 23—184)

This invention relates to a new method for producing ozonides wherein a superoxide is reacted with an aluminum halide.

Compounds having the $O_3^-$ anion are, according to presently approved nomenclature, called ozonides, although such compounds have in the past at times been referred to as ozonates.

As described in the art, methods which have been used to produce ozonides heretofore result in low yields and involve difficult techniques in order to isolate and purify the product. In addition, the relative instability of the ozonides has made these tedious and cumbersome processes unsatisfactory because of the tendency of the product to decompose during the processing steps required. Thus, ozonides have been accorded little more than passing interest in the chemical art.

The chief object of this invention is to provide a new method of making ozonides which is simpler, more easily practiced and more economical than those previously known.

This invention is based on my discovery that an alkali metal or a tetra(lower alkyl)ammonium superoxide reacts with aluminum chloride or bromide to produce the corresponding alkali metal or tetra(lower-alkyl)ammonium ozonide.

Obtention of the ozonide as the product of the above-described reaction is surprising inasmuch as the only oxygen-containing reactant in the system is the superoxide. The mechanism of the process is not fully understood, but it is believed that aluminum superoxide is a transitory intermediate in the reaction. Thus, if the reaction does take place in the manner theorized, the aluminum superoxide is the initial product of the reaction and, due to its instability, immediately decomposes. The decomposition product then reacts with additional superoxide to produce the ozonide.

The process is applicable to the reaction of aluminum chloride or aluminum bromide with any alkali metal superoxide or tetra(lower alkyl)ammonium superoxide. Thus, for example, among the alkali metal superoxides which can be used are sodium superoxide and potassium superoxide, and the process can be practiced using tetra-(lower alkyl)ammonium superoxides such as tetramethylammonium superoxide, tetraethylammonium superoxide, tetrapropylammonium superoxide and tetrabutylammonium superoxide.

One of the chief advantages of the present method is its relative simplicity and ease of practice. No particular conditions of reaction are required and the reaction takes place upon mixing the reactants. It is preferred to mix the reactants intimately. Thus, it is desirable to use abrasive contact, such as is provided on a small scale by mixing in a mortar and pestle and on a larger scale in suitable apparatus such as a ball mill.

The ease with which my method is practiced is exemplified by a test in which tetramethylammonium superoxide and aluminum bromide were mixed together in a mortar and pestle. Immediate reaction took place and the reaction mixture turned a brilliant red, thus, as has been found, qualitatively indicating the presence of ozonides. Analysis of the product by X-ray diffraction techniques showed that the red solid obtained was tetramethylammonium ozonide $(CH_3)_4NO_3$.

In a similar manner, other tetra(lower alkyl)ammonium ozonides are produced. Thus, the reaction of tetraethylammonium superoxide with aluminum chloride produces tetraethylammonium ozonide, $(C_2H_5)_4NO_3$. The process utilizing the alkali metal superoxides is also carried out in the above manner. For example, the similar mixing of potassium superoxide with aluminum bromide produces potassium ozonide, $KO_3$, and the reaction of sodium superoxide with aluminum chloride produces sodium ozonide, $NaO_3$.

The product is recovered from the reaction mixture by conventional techniques. We have found it most efficient to effect recovery by extraction of the mixture with liquid ammonia. Thus, for example, potassium ozonide produced as described above from the reaction of potassium superoxide with aluminum bromide is recovered by extracting the reaction mixture with liquid ammonia, the potassium ozonide being obtained in the ammonia-soluble portion. Other ozonides are recovered similarly; extraction with liquid ammonia is generally used because we have found that in each case the ozonide is more soluble than the corresponding superoxide.

The ozonides obtained by the method comprising my invention are powerful oxidizing agents and can be used to oxidize organic compounds to carbon dioxide. Thus, the use of such compounds provides an analytical method whereby the amount of carbon in organic compounds can be determined by measuring the amount of carbon dioxide obtained from the oxidation. The ozonides are also sources of oxygen and can be used, for example, in self-contained breathing apparatus for use in confined spaces where oxygen is not available in the atmosphere. The oxygen is released from these compounds upon contact with moisture so that the passage of exhaled air containing moisture through a container of ozonides in a suitable apparatus produces fresh oxygen. Well known equipment used to produce breathing oxygen from superoxides is suitable for use with the ozonides in this manner.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. A method of producing an ozonide which comprises reacting a superoxide selected from the group consisting of alkali metal and tetra(lower alkyl)ammonium superoxides with an aluminum halide selected from the group consisting of alkali metal and tetra(lower alkyl)ammonium superoxides with an aluminum halide selected from the group consisting of aluminum chloride and aluminum bromide, and recovering the ozonide thus formed.

2. A method in accordance with claim 1 in which said superoxide is potassium superoxide.

3. A method in accordance with claim 1 in which said superoxide is sodium superoxide.

4. A method in accordance with claim 1 in which said superoxide is tetramethylammonium superoxide.

5. A method in accordance with claim 1 in which the ozonide is recovered by extraction of the reaction mixture with liquid ammonia.

No references cited.

UNITED STATES PATENT OFFICE
CERTIFICATE OF CORRECTION

Patent No. 3,115,392                          December 24, 1963

Joseph S. Hashman

It is hereby certified that error appears in the above numbered patent requiring correction and that the said Letters Patent should read as corrected below.

Column 2, lines 54 to 56, strike out "alkali metal and tetra(lower alkyl)ammonium superoxides with an aluminum halide selected from the group consisting of".

Signed and sealed this 26th day of May 1964.

(SEAL)
Attest:

ERNEST W. SWIDER                          EDWARD J. BRENNER
Attesting Officer                              Commissioner of Patents